US012763069B2

(12) United States Patent
Yang et al.

(10) Patent No.: US 12,763,069 B2
(45) Date of Patent: Oct. 13, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Jaechul Yang, Suwon-si (KR); Munjo Kim, Suwon-si (KR); Yeonho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 202 days.

(21) Appl. No.: 18/518,138

(22) Filed: Nov. 22, 2023

(65) Prior Publication Data

US 2024/0290325 A1 Aug. 29, 2024

Related U.S. Application Data

(63) Continuation of application No. PCT/KR2023/016872, filed on Oct. 27, 2023.

(30) Foreign Application Priority Data

Feb. 23, 2023 (KR) ........................ 10-2023-0024501

(51) Int. Cl.
*G10L 15/22* (2006.01)
*G06F 16/632* (2019.01)
(Continued)

(52) U.S. Cl.
CPC ........ *G10L 15/1815* (2013.01); *G06F 16/632* (2019.01); *G06F 40/30* (2020.01);
(Continued)

(58) Field of Classification Search
None
See application file for complete search history.

(56) References Cited

U.S. PATENT DOCUMENTS 8,521,526 B1 * 8/2013 Lloyd ................. G06F 16/3344
704/251
9,940,929 B2 4/2018 VanBlon et al.
(Continued)

FOREIGN PATENT DOCUMENTS

KR 10-2018-0084392 A 7/2018
KR 10-2020-0045851 A 5/2020
(Continued)

OTHER PUBLICATIONS

Written Opinion of the International Search Authority dated Dec. 8, 2023 for PCT/KR2023/016872. (Year: 2023).*
(Continued)

*Primary Examiner* — Richard Z Zhu
(74) *Attorney, Agent, or Firm* — Sughrue Mion, PLLC

(57) ABSTRACT

An electronic apparatus includes a microphone; a speaker; a memory storing at least one instruction; and one or more processors operatively coupled to the memory and the speaker, wherein the one or more processors are configured to execute the at least one instruction to: based on identifying that a first voice sensed through the microphone corresponds to a wake-up voice, convert a state of the electronic apparatus from a standby state to a wake-up state, based on a second voice being sensed while the state of the electronic apparatus is the wake-up state, identify a first user query included in first voice data obtained based on the second voice, perform a first operation corresponding to the first user query, identify a predetermined query corresponding to the first user query, obtain a query list including at least one query based on the predetermined query and user context information, identify a second user query included in second voice data obtained based on a third voice sensed through the microphone, and based on a first semantic similarity between the second user query and the at least one query of the query list being greater than or equal to a
(Continued)

predetermined value, perform a second operation corresponding to the second user query and maintain the state of the electronic apparatus as the wake-up state.

18 Claims, 11 Drawing Sheets

(51) Int. Cl.

| | |
|---|---|
| ***G06F 40/30*** | (2020.01) |
| ***G10L 15/08*** | (2006.01) |
| ***G10L 15/18*** | (2013.01) |
| ***G10L 15/183*** | (2013.01) |
| *G06F 40/35* | (2020.01) |

(52) U.S. Cl.
CPC .......... *G10L 15/08* (2013.01); *G10L 15/1822* (2013.01); *G10L 15/183* (2013.01); *G06F 40/35* (2020.01); *G10L 15/22* (2013.01); *G10L 2015/223* (2013.01)

(56) References Cited

U.S. PATENT DOCUMENTS

| | | | | |
|---|---|---|---|---|
| 10,860,799 | B2 * | 12/2020 | Andreica | G06F 40/295 |
| 11,450,315 | B2 * | 9/2022 | Kim | G10L 15/22 |
| 11,580,964 | B2 * | 2/2023 | Jung | G10L 15/22 |
| 11,929,081 | B2 | 3/2024 | Yang et al. | |
| 11,934,794 | B1 * | 3/2024 | Hill | G06F 40/35 |
| 11,955,123 | B2 * | 4/2024 | Park | G10L 15/22 |
| 2017/0236513 | A1 * | 8/2017 | Choudhury | G10L 15/063 704/244 |
| 2019/0311713 | A1 * | 10/2019 | Talwar | G06F 40/30 |
| 2019/0318759 | A1 * | 10/2019 | Doshi | G10L 15/04 |
| 2020/0027456 | A1 * | 1/2020 | Kim | G10L 15/22 |
| 2020/0051554 | A1 * | 2/2020 | Kim | G06F 3/167 |
| 2020/0082814 | A1 * | 3/2020 | Xiong | G10L 15/22 |
| 2020/0125603 | A1 | 4/2020 | Ha et al. | |
| 2020/0258506 | A1 * | 8/2020 | Slifka | G06F 40/295 |
| 2020/0272690 | A1 * | 8/2020 | Howard | G06N 5/02 |
| 2021/0090562 | A1 | 3/2021 | Luo et al. | |
| 2021/0097992 | A1 | 4/2021 | Luo et al. | |
| 2021/0110824 | A1 | 4/2021 | Lim et al. | |
| 2021/0166680 | A1 * | 6/2021 | Jung | G10L 15/1815 |
| 2021/0191952 | A1 * | 6/2021 | He | G06F 16/90332 |
| 2021/0200813 | A1 * | 7/2021 | Xu | G06F 16/3347 |
| 2022/0301560 | A1 | 9/2022 | Park et al. | |
| 2023/0022515 | A1 * | 1/2023 | Aher | H04N 21/42203 |
| 2023/0074406 | A1 * | 3/2023 | Baeuml | G06F 16/90332 |
| 2023/0154470 | A1 | 5/2023 | Yang et al. | |
| 2023/0267929 | A1 | 8/2023 | Park et al. | |
| 2024/0290327 | A1 * | 8/2024 | Byrne | G06F 3/167 |

FOREIGN PATENT DOCUMENTS

| | | |
|---|---|---|
| KR | 10-2021-0031141 A | 3/2021 |
| KR | 10-2021-0042520 A | 4/2021 |
| KR | 10-2022-0045741 | 4/2022 |
| KR | 10-2022-0064273 A | 5/2022 |
| KR | 10-2022-0111574 A | 8/2022 |
| KR | 10-2022-0123980 A | 9/2022 |
| KR | 10-2022-0129366 A | 9/2022 |

OTHER PUBLICATIONS

International Search Report (PCT/ISA/210) issued Feb. 16, 2024 by the International Searching Authority in International Patent Application No. PCT/KR2023/016872.

Written Opinion (PCT/ISA/237) issued Feb. 16, 2024 by the International Searching Authority in International Patent Application No. PCT/KR2023/016872.

* cited by examiner

ELECTRONIC APPARATUS AND CONTROLLING METHOD THEREOF

CROSS-REFERENCE TO RELATED APPLICATIONS

This application is a continuation application of International Application No. PCT/KR2023/016872, filed on Oct. 27, 2023, which claims priority to Korean Patent Application No. 10-2023-0024501, filed on Feb. 23, 2023, in the Korean Intellectual Property Office, the disclosures of which are incorporated by reference herein in their entireties.

BACKGROUND

1. Field

The present disclosure relates to electronic apparatuses and controlling methods thereof, and more particularly, to an electronic apparatus that recognizes a user's continuous utterance, query, and/or voice without a repetitive wake-up operation, and a controlling method thereof.

2. Description of Related Art

A user of an electronic device may perform operations (e.g., provide queries and/or receive answers) with the electronic device more conveniently by using voice commands rather than going through a potentially complicated manipulation process using buttons, touch panels, levers, sensors, and the like, that may be provided by the electronic device.

However, in order to interpret a user's voice and perform a corresponding operation, the electronic device may first need to perform a wake-up operation in which the electronic device may enter a preparation step (and/or state) for interpreting the user's voice. As used herein, a wake-up operation may refer to an operation for interpreting only the user's voice and/or command to be input into the electronic device without misinterpreting other utterances of the user's voice during the course of daily life.

For example, technologies such as, but not limited to, automatic speech recognition (ASR) models, natural language understanding (NLU) modules, natural language generation (NLG) module, and the like, may be used to interpret the meaning that may be contained in the user's utterance, query, and/or voice. These technologies may be used by the electronic device to perform an operation intended by the user and/or to provide answers that the user may be requesting.

In addition, the electronic device may use a technology, such as, but not limited to, text-to-speech (TTS) modules, to convert text data into voice data as part of a process of providing answers to the user.

SUMMARY

According to an aspect of the disclosure, an electronic apparatus includes: a microphone; a speaker; a memory storing at least one instruction; and one or more processors operatively coupled to the memory and the speaker, wherein the one or more processors are configured to execute the at least one instruction to: based on identifying that a first voice sensed through the microphone corresponds to a wake-up voice, convert a state of the electronic apparatus from a standby state to a wake-up state, based on a second voice being sensed while the state of the electronic apparatus is the wake-up state, identify a first user query included in first voice data obtained based on the second voice, perform a first operation corresponding to the first user query, identify a predetermined query corresponding to the first user query, obtain a query list including at least one query based on the predetermined query and user context information, identify a second user query included in second voice data obtained based on a third voice sensed through the microphone, and based on a first semantic similarity between the second user query and the at least one query of the query list being greater than or equal to a predetermined value, perform a second operation corresponding to the second user query and maintain the state of the electronic apparatus as the wake-up state.

The one or more processors may be further configured to execute the at least one instruction to, based on the first semantic similarity being less than the predetermined value, change the state of the electronic apparatus from the wake-up state to the standby state without performing the second operation corresponding to the second user query.

The one or more processors may be further configured to execute the at least one instruction to: identify a domain of the first user query; and identify the predetermined query based on the domain.

The user context information may include at least one of a query history of a user, a query response history of the user, a location of the user, a current time, an ambient temperature, a current state of the electronic apparatus, or a use history of the electronic apparatus by the user.

The one or more processors may be further configured to execute the at least one instruction to: identify a relevance to the first user query for each of the at least one query of the query list based on the predetermined query and the user context information; identify a second semantic similarity between the second user query and a corresponding query from among the query list having a maximum relevance to the first user query; based on the second semantic similarity being greater than or equal to the predetermined value, perform the second operation corresponding to the second user query and maintain the state of the electronic apparatus as the wake-up state; and based on the second semantic similarity being less than the predetermined value, convert the state of the electronic apparatus from the wake-up state to the standby state and prevent performing the second operation corresponding to the second user query.

The user context information may include at least one of a query history of a user, a query response history of the user, a location of the user, a current time, an ambient temperature, a current state of the electronic apparatus, or a use history of the electronic apparatus by the user, and the one or more processors may be further configured to execute the at least one instruction to: identify a domain of the first user query; identify the predetermined query based on the domain; allocate a predetermined weight corresponding to the domain to the user context information; and obtain the query list including the at least one query based on the predetermined query, the user context information, and the predetermined weight allocated to the user context information.

The one or more processors may be further configured to execute the at least one instruction to exclude, from the query list, an unperformable query corresponding to an operation that is not currently performable by the electronic apparatus.

The one or more processors may be further configured to execute the at least one instruction to: identify a domain of the second user query; based on the domain requiring user confirmation, control the speaker to output a voice requesting confirmation on whether the second operation corresponding to the second user query is to be performed; based on content approving to perform the second operation, perform the second operation corresponding to the second user query and maintain the state of the electronic apparatus as the wake-up state, the content being included in third voice data obtained based on a fourth voice sensed through the microphone; and based on the content not approving to perform the second operation, change the state of the electronic apparatus from the wake-up state to the standby state and prevent performing the second operation corresponding to the second user query.

The one or more processors may be further configured to execute the at least one instruction to: identify an elapsed time from a first time point when the second voice is sensed through the microphone to a second time point when the third voice is sensed through the microphone; and based on the elapsed time being less than or equal to a predetermined time, identify the second user query from the second voice data obtained based on the third voice.

The one or more processors may be further configured to execute the at least one instruction to: obtain the query list including the at least one query based on a first vector value output by a query prediction model based on the predetermined query and the user context information, and the query prediction model is trained based on a second vector value generated by the query prediction model based on providing a third user query and the user context information to the query prediction model.

According to an aspect of the disclosure, a controlling method of an electronic apparatus, includes: based on identifying that a first voice sensed corresponds to a wake-up voice, converting a state of the electronic apparatus from a standby state to a wake-up state; based on a second voice being sensed while the state of the electronic apparatus is the wake-up state, identifying a first user query included in first voice data obtained based on the second voice sensed through a microphone of the electronic apparatus; performing a first operation corresponding to the first user query; identifying a predetermined query corresponding to the first user query; obtaining a query list including at least one query based on the predetermined query and user context information; identifying a second user query included in second voice data obtained based on a third voice sensed through the microphone; and based on a first semantic similarity between the second user query and the at least one query of the query list being greater than or equal to a predetermined value, performing a second operation corresponding to the second user query and maintaining the state of the electronic apparatus as the wake-up state.

The controlling method may further include, based on the first semantic similarity being less than the predetermined value, changing the state of the electronic apparatus from the wake-up state to the standby state without performing of the second operation corresponding to the second user query.

The identifying the predetermined query may include: determining a domain of the first user query; and identifying the predetermined query based on the domain.

The user context information may include at least one of a query history of a user, a query response history of the user, a location of the user, a current time, an ambient temperature, a current state of the electronic apparatus, or a use history of the electronic apparatus by the user.

The controlling method may further include: identifying a relevance to the first user query for each of the at least one query of the query list based on the predetermined query and the user context information; identifying a second semantic similarity between the second user query and a corresponding query from among the query list having a maximum relevance to the first user query; based on the second semantic similarity being greater than or equal to the predetermined value, performing the second operation corresponding to the second user query and maintaining the state of the electronic apparatus as the wake-up state; and based on the second semantic similarity being less than the predetermined value, changing the state of the electronic apparatus from the wake-up state to the standby state and preventing the performing of the second operation corresponding to the second user query.

BRIEF DESCRIPTION OF THE DRAWINGS

The above-described or other aspects, features and advantages of certain embodiments of the present disclosure may be more apparent from the following description taken in conjunction with the accompanying drawings, in which.

DETAILED DESCRIPTION

Figure 1:
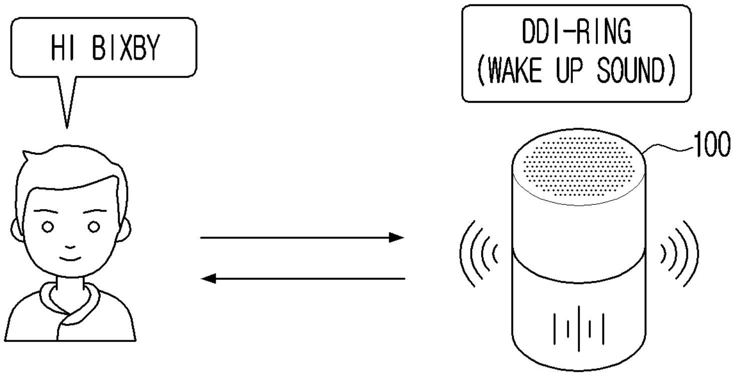
FIG. 1 is a view of an electronic apparatus that recognizes a user voice and performs a wake-up operation, according to one or more embodiments.

The present disclosure may be variously modified and have several exemplary embodiments, specific example embodiments of the present disclosure may be illustrated in the drawings and be described in detail in the detailed description. However, it may be understood that the present disclosure is not limited to specific example embodiments, but may include all modifications, equivalents, and/or substitutions according to example embodiments of the present disclosure. Throughout the accompanying drawings, similar components may be denoted by similar reference numerals.

In describing the present disclosure, when a detailed description for known functions and/or configurations related to the present disclosure may unnecessarily obscure the gist of the present disclosure, the detailed description thereof may be omitted.

In addition, the following example embodiments may be modified in several different forms, and the scope and spirit of the present disclosure is not limited to the following example embodiments. Rather, these example embodiments make the present disclosure thorough and complete, and are provided to transfer the spirit of the present disclosure to those skilled in the art.

Terms used in the present disclosure may be used only to describe specific example embodiments rather than limiting the scope of the present disclosure. Singular forms may be intended to include plural forms unless the context clearly indicates otherwise.

In the present disclosure, expressions such as "have," "may have," "include," "may include," and the like, may indicate existence of a corresponding feature (e.g., a numerical value, a function, an operation, a component such as a part, and the like), and may not exclude existence of additional features.

In the present disclosure, expressions such as "A or B," "at least one of A and/or B," "one or more of A and/or B," and the like, may include all possible combinations of items enumerated together. For example, "A or B," "at least one of A and B," or "at least one of A or B" may indicate all of a case in which only A is included, a case in which only B is included, or a case in which both of A and B are included.

Expressions such as "first", "second", "1st," "2nd," and the like, as used in the present disclosure may indicate various components regardless of a sequence and/or importance of the components, and may be used only to distinguish one component from the other components, and may not limit the corresponding components.

It may be understood that if any component (e.g., a first component) is referred to be (operatively and/or communicatively) coupled with/to or is connected to another component (e.g., a second component), that the component may be directly coupled to another component and/or may be coupled to another component through the other component (e.g., a third component).

Alternatively or additionally, it may be understood that if any component (e.g., a first component) is referred to as being "directly coupled" and/or "directly connected" to another component (e.g., a second component), that the other component (e.g., a third component) may not be present between the any component and the another component.

An expression such as "~configured (or set) to" as used in the present disclosure may be replaced by an expression such as "suitable for," "having the capacity to," "~designed to," "~adapted to," "~made to," or "~capable of" depending on a situation. That is, a term such as "~configured (or set) to" may not necessarily refer to being "specifically designed to" in hardware.

Alternatively or additionally, an expression such as "~an apparatus configured to" may indicate that the apparatus "is capable of" together with other apparatuses and/or components. For example, a "processor configured (or set) to perform A, B, and C" may refer to a dedicated processor (e.g., an embedded processor) for performing the corresponding operations and/or a generic-purpose processor (e.g., a central processing unit (CPU) or an application processor) that may perform the corresponding operations by executing one or more software programs stored in a memory apparatus.

In example embodiments, a "module" and/or a "unit" may perform at least one function and/or operation, and may be implemented by hardware and/or software, and/or may be implemented by a combination of hardware and software. In addition, a plurality of "modules" and/or a plurality of "units" may be integrated into at least one module and may be implemented by at least one processor except for a "module" and/or a "unit" that may need to be implemented by specific hardware.

Various components and areas in the drawings are schematically drawn. That is, the technical spirit of the present disclosure is not limited by the relative size and/or spacing drawn in the accompanying drawings.

Hereinafter, various embodiments according to the present disclosure may be described with reference to the accompanying drawings so that those skilled in the art may easily implement it.

FIG. 1 is a view of an electronic apparatus that recognizes a user voice and performs a wake-up operation, according to one or more embodiments.

Referring to FIG. 1, an electronic apparatus 100 may sense a user's wake-up voice (e.g., utterance and/or query) and may perform a wake-up operation. As used herein, the wake-up operation may refer to an operation of converting a state of the electronic apparatus 100 from a standby state to a wake-up state.

For example, when the electronic apparatus 100 is in the standby state, the electronic apparatus 100 may not sense an external voice, and/or even if the electronic apparatus 100 senses an external voice (e.g., from the user), the electronic apparatus 100 may not perform an operation corresponding to the external voice. Alternatively or additionally, when the electronic apparatus 100 is in the standby state, the electronic apparatus 100 may not obtain data corresponding to a sensed voice and/or may not perform an operation corresponding to obtained voice data. That is, when the electronic apparatus 100 is in the standby state, at least one operation and/or function of the electronic apparatus 100 may be inactivated, such as, for example, a text-to-speech (TTS) module.

When a voice corresponding to a wake-up voice is sensed while the electronic apparatus 100 is in the standby state, the electronic apparatus 100 may perform a wake-up operation. For example, the wake-up operation may include converting the state of the electronic apparatus 100 from the standby state to the wake-up state. That is, the electronic apparatus 100 may transition from the standby state to the wake-up state based on sensing the wake-up voice.

When the electronic apparatus 100 is in the wake-up state, the electronic apparatus 100 may sense an external voice and may perform an operation corresponding to the sensed external voice.

The wake-up operation may refer to an operation of recognizing (e.g., interpreting) a user voice and/or a command to be input to the electronic apparatus 100 without misrecognizing (e.g., misinterpreting) other utterances of the user's voice during the course of daily life.

For example, the electronic apparatus 100 may sense a wake-up voice of "Hi, Bixby" and perform a wake-up operation. That is, the electronic apparatus 100 may control a speaker 120 to output a notification sound and/or a sound effect such as "ddi-ring" to notify the user whether or not the wake-up operation is performed.

After performing the wake-up operation, the electronic apparatus 100 may sense a user voice and identify a user command (or query) included in voice data obtained based on the user voice. That is, the electronic apparatus 100 may extract a user command from voice data obtained based on the user voice. The electronic apparatus 100 may perform an operation corresponding to the identified user command, such as, for example, controlling an external device and/or providing an answer.

In some embodiments, the electronic apparatus 100 may include apparatus configuration (e.g., hardware and/or software components) that may be needed to perform voice recognition by sensing a user voice (e.g., utterance or query) and to perform an operation corresponding to the user voice.

When a sensed voice corresponds to a wake-up voice, the electronic apparatus 100 may perform a wake-up operation and may perform an operation corresponding to another user's voice command that may be subsequently received.

For example, whenever the user tries to input a voice command, the user may need to utter a voice corresponding to a wake-up voice right before uttering the voice command. As such, the user may be inconvenienced when attempting to command the electronic apparatus 100 to perform several voice commands in succession by a need utter a wake-up voice before uttering each voice command.

Accordingly, there is a need to perform an operation by recognizing continuous utterances without recognizing the wake-up voice separately as in the electronic apparatus 100 provided according to one or more embodiments.

Figure 2:
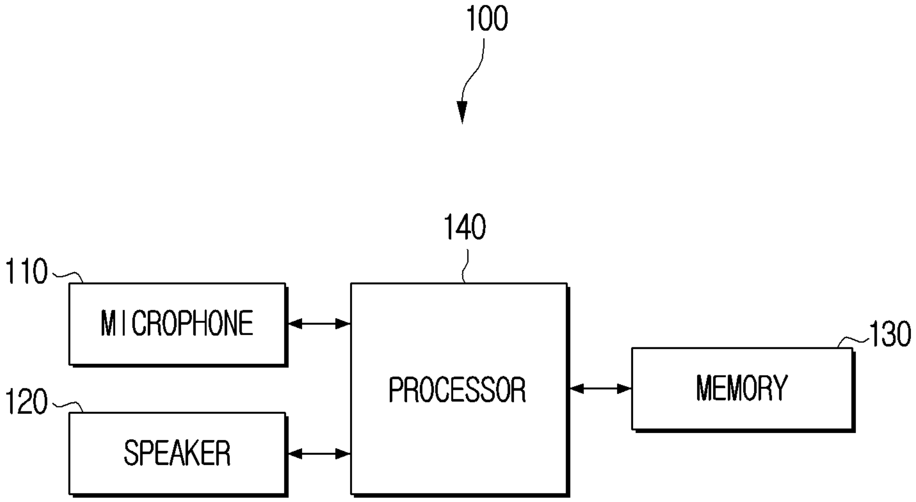
FIG. 2 is a block diagram of a configuration of an electronic apparatus, according to one or more embodiments.

FIG. 2 is a block diagram of a configuration of the electronic apparatus 100, according to one or more embodiments.

Referring to FIG. 2, the electronic apparatus 100 may include a microphone 110, a speaker 120, a memory 130, and one or more processors 140 (hereinafter, referred to as a processor 140). However, the configuration of the electronic apparatus 100 is not limited thereto, and may include other components, such as, but not limited to, a user interface, a communication interface, and the like, with which to sense a user voice and to perform a corresponding operation. Alternatively or additionally, the configuration of the electronic apparatus 100 may omit one or more components and/or may differently arrange components of the configuration.

The microphone 110 may refer to a module that may obtain (e.g., capture) sound and may convert the captured sound into an electrical signal. The microphone 110 may include, but not be limited to, a condenser microphone, a ribbon microphone, a moving coil microphone, a piezoelectric element microphone, a carbon microphone, and a micro electro mechanical system (MEMS) microphone. Alternatively or additionally, the microphone 110 may be implemented using non-directional, bi-directional, unidirectional, sub-cardioid, super-cardioid, and/or hyper-cardioid methods.

The processor 140 may sense a voice in real time through the microphone 110, and may obtain voice data corresponding to the sensed voice. Alternatively or additionally, the processor 140 may generate audio data by inserting authentication information to the obtained voice data using a non-audible frequency insertion method.

The processor 140 may sense a user voice through the microphone 110 and obtain voice data. When it is identified that the obtained voice data corresponds to a user's wake-up voice, the processor 140 may perform a wake-up operation.

In some embodiments, the processor 140 may identify a user command included in the obtained voice data. The processor 140 may perform an operation corresponding to the identified user command and/or may control the speaker 120 to output an answer to an identified user query.

The processor 140 may identify a user command included in the obtained voice data using at least one of an automatic speech recognition (ASR) model, a natural language understanding (NLU) module, a natural language generation (NLG) module, and the like.

The speaker 120 may consist of a tweeter for high-pitched sound reproduction, a midrange for mid-range sound reproduction, a woofer for low-pitched sound reproduction, a subwoofer for extremely low-pitched sound reproduction, an enclosure for controlling resonance, and a crossover network that may divide an electrical signal frequency input to the speaker 120 into bands, and the like.

The speaker 120 may output a sound signal to the outside of the electronic apparatus 100. For example, the speaker 120 may output multimedia reproduction, recording reproduction, notification sounds, voice messages, and the like. The electronic apparatus 100 may include an audio output device such as the speaker 120, and/or may include an output device such as an audio output terminal. In some embodiments, the speaker 120 may provide obtained information, information processed and/or produced based on the obtained information, a response result, and/or an operation regarding a user voice in the form of voice and/or another audio signal (e.g., beep, chime, and the like).

The processor 140 may control the speaker 120 to output a voice including a notification corresponding to an identified user query and/or a user command. Alternatively or additionally, the processor 140 may control the speaker 120 to output a voice including an answer corresponding to the identified user query and/or a user command.

In some embodiments, the processor 140 may control the speaker 120 to output a voice that is converted through a TTS module.

The memory 130 may store various programs and/or data temporarily and/or non-temporarily, and may transmit stored information to the processor 140 according to a call of the processor 140. In addition, the memory 130 may store various types of information necessary for calculation, processing, and/or control operations of the processor 140 in an electronic format.

The memory 130 may include, for example, at least one of a main memory device and an auxiliary memory device. The main memory device may be implemented using a semiconductor storage medium such as, but not limited to, a read only memory (ROM) and a random access memory (RAM). The ROM may include, for example, a conventional ROM, an erasable and programmable ROM (EPROM), an electrically erasable and a programmable ROM (EEPROM), and/or a mask ROM. The RAM may include, for example, a dynamic RAM (DRAM) and/or a static RAM (SRAM). The auxiliary memory device may be implemented using at least one storage medium which may permanently and/or semi-permanently store data, such as, but not limited to, an optical media including a flash memory device, a secure digital (SD) card, a solid state drive (SSD), a hard disk drive (HDD), a magnetic drum, a compact disc (CD), a digital versatile disc (DVD) or a laser disc, a magnetic tape, a magneto-optical disk, a floppy disk, and the like.

The memory 130 may store information regarding a wake-up voice. For example, the wake-up voice may be "Hi, Bixby". However, the present disclosure is not limited thereto.

The memory 130 may store information regarding a user voice and/or a user query. The memory 130 may store a query list including at least one user query. The memory 130 may store domain information corresponding to a user voice or a user query. The memory 130 may store information regarding a domain requiring user confirmation.

The memory 130 may store user context information, such as, for example, a user's query history, a user's query response history, a user's location, a current time, an ambient temperature, a current state of the electronic apparatus 100, a user's use history of the electronic apparatus 100, and the like. However, the user context information is not limited thereto. In addition, the memory 130 may store weight information allocated to each user context information.

The memory 130 may store information regarding a relevance between different queries and/or information regarding a semantic similarity between different queries. As used herein, relevance may refer to a degree of possibility that different queries may be identified successively.

The memory 130 may store information regarding an ASR model, a NLU module, a NLG module, and/or a TTS module.

The memory 130 may store information regarding a neural network model, for example, a query prediction model.

The memory 130 may store information regarding layers, nodes, weights, loss functions, input data, output data and other earning data of each model involved in a voice recognition operation.

The one or more processors 140 may control the overall operations of the electronic apparatus 100. For example, the processor 140 may be connected (e.g., communicatively coupled) to the configuration of components of the electronic apparatus 100 that may include the memory 130 as described above. The processor 140 may control the overall operations of the electronic apparatus 100 by executing at least one instruction stored in the memory 130 as described above. In some embodiments, the processor 140 may be implemented as one processor 140. In some optional or additional embodiments, the processor 140 may be implemented as a plurality of processors 140.

The processor 140 may be implemented in various methods. For example, the one or more processors 140 may include at least one of a CPU, a graphics processing unit (GPU), an accelerated processing unit (APU), a many integrated core (MIC), a digital signal processor (DSP), a neural processing unit (NPU), a hardware accelerator, a machine learning accelerator, and the like. The one or more processors 140 may control one or any combination of other components of the electronic apparatus 100, and may perform an operation related to communication and/or data processing. The one or more processors 140 may execute one or more programs and/or instructions stored in the memory 130. For example, the one or more processors 140 may perform a method according to one or more embodiments by executing one or more instructions stored in the memory 130.

When a method according to one or more embodiments includes a plurality of operations, the plurality of operations may be performed by one processor 140 or a plurality of processors 140. For example, when a first operation, a second operation, and a third operation are performed according to one or more embodiments, all of the first operation, the second operation and the third operation may be performed by a first processor, and/or the first operation and the second operation may be performed by the first processor (e.g., a general-purpose processor) and the third operation may be performed by a second processor (e.g., an artificial intelligence (AI)-only processor).

The one or more processors 140 may be implemented as a single core processor 140 including one core, and/or may be implemented as one or more multicore processors including a plurality of cores (e.g., homogeneous multicores, heterogeneous multicores). In a case in which the one or more processors 140 are implemented as the multicore processor, each of the multicores included in the multicore processor may include a memory inside the processor 140 such as an on-chip memory, and a common cache shared by the multicores may be included in the multicore processor. In addition, each of the plurality of cores included in the multicore processor (or some of the multicores) may independently read and/or perform a program instruction for implementing the method according to one or more embodiments of the present disclosure. In some embodiments, a portion (e.g., all or at least some) of the multicores may be linked with each other to read and/or perform the program instruction for implementing the method according to one or more embodiments of the present disclosure.

When a method according to one or more embodiments includes a plurality of operations, the plurality of operations may be performed by one of a plurality of cores included in the multicore processor and/or may be performed by a plurality of cores. For example, when a first operation, a second operation, and a third operation are performed according to one or more embodiments, all of the first operation, the second operation, and the third operation may be performed by a first processor included in the multicore processor, and/or the first operation and the second operation may be performed by the first processor included in the multicore processor 140 and the third operation may be performed by a second processor included in the multicore processor 140.

According to one or more embodiments, the processor 140 may refer to a system-on-chip (SoC) in which one or more processors 140 and other electronic components may be integrated, the single core processor, the multicore processor, and/or the core included in the single core processor or the multicore processor. In some embodiments, the core may be implemented as the CPU, the GPU, the APU, the MIC, the DSP, the NPU, the hardware accelerator, and/or the machine learning accelerator. However, the present disclosure is not limited thereto.

The processor 140 may identify whether a first voice sensed through the microphone 110 corresponds to a wake-up voice. When the processor 140 identifies that the first voice corresponds to the wake-up voice, the processor 140 may convert (e.g., transition) a state of the electronic apparatus 100 from a standby state to a wake-up state.

For example, the standby state may refer to a state in which an external voice is not sensed and/or, even if the electronic apparatus 100 senses the external voice (e.g., from the user), the electronic apparatus 100 may not perform an operation corresponding to the external voice. Alternatively or additionally, when the electronic apparatus 100 is in the standby state, the electronic apparatus 100 may be a state in which data corresponding to the sensed voice may not be obtained and/or an operation corresponding to the obtained voice data may not be performed (e.g., a TTS module may be inactivated).

The wake-up state may refer to a state in which an external voice may be sensed and voice data may be obtained based on the external voice. Alternatively or additionally, in the wake-up state, the processor 140 may perform an operation corresponding to the obtained voice data.

When a second voice is sensed while the electronic apparatus 100 is in the wake-up state, a user's first query included in first voice data obtained based on a second voice may be identified.

For example, the user's first query may include an inquiry (e.g., request) about information that the user may wish to know.

In some embodiments, the processor 140 may perform an operation corresponding to the first query. For example, the operation corresponding to the first query may be and/or may include an operation in which the processor 140 controls at least a portion of the configuration of the electronic apparatus 100 to provide the user with a service. Alternatively or additionally, the operation corresponding to the first query may be and/or may include an operation of controlling the speaker 120 to output an answer to the user's query.

The processor 140 may identify a query corresponding to the first query. The query corresponding to the first query may be a query different from the first query, and/or may be any query candidate that may be subsequently identified after the first query. In some embodiments, the query corresponding to the first query may be related to a domain corresponding to the first query (e.g., weather, route finding, schedule, and the like). In other words, the first query and the query corresponding to the first query may correspond to the same domain, but may be different queries.

The processor 140 may obtain a query list including the query corresponding to the first query and at least one query based on user context information. As used herein, the user context information may include at least one of the current state of the electronic apparatus 100, the user's use history of the electronic apparatus 100, the user's query history, time, location, temperature, and the like. However, the present disclosure is not limited thereto.

The processor 140 may identify the user's second query included in second voice data obtained based on a third voice sensed through the microphone 110.

When a semantic similarity between the identified second query and at least one query included in the query list is greater than or equal to a predetermined value, the processor 140 may perform an operation corresponding to the second query and maintain the wake-up state of the electronic apparatus 100.

When a semantic similarity between the second query and at least one query included in the query list is less than the predetermined value, the processor 140 may not perform an operation corresponding to the second query and/or may convert the state of the electronic apparatus 100 from the wake-up state to the standby state.

That is, when the user's first voice corresponds to the wake-up voice, the processor 140 may convert the state of the electronic apparatus 100 from the standby state to the wake-up state. While the electronic apparatus 100 is in the wake-up state, the processor 140 may perform an operation corresponding to the first query corresponding to the user's second voice, and obtain a query list including a subsequent query that may be identified successively based on the first query. When a semantic similarity between the second query corresponding to the user's third voice obtained after the first query and a query included in the pre-obtained query list is greater than or equal to a predetermined value, the processor 140 may perform an operation corresponding to the second query and maintain the state of the electronic apparatus 100 as the wake-up state.

As a result, the processor 140 may select a subsequent query candidate that may be identified successively after the preceding query, and when the corresponding subsequent query is identified, the processor 140 may perform an operation corresponding to the user's subsequent query without performing a separate additional wake-up operation.

Hereinafter, a control operation of the electronic apparatus 100 by the processor 140 is described with reference to FIGS. 3 to 10.

Figure 3:
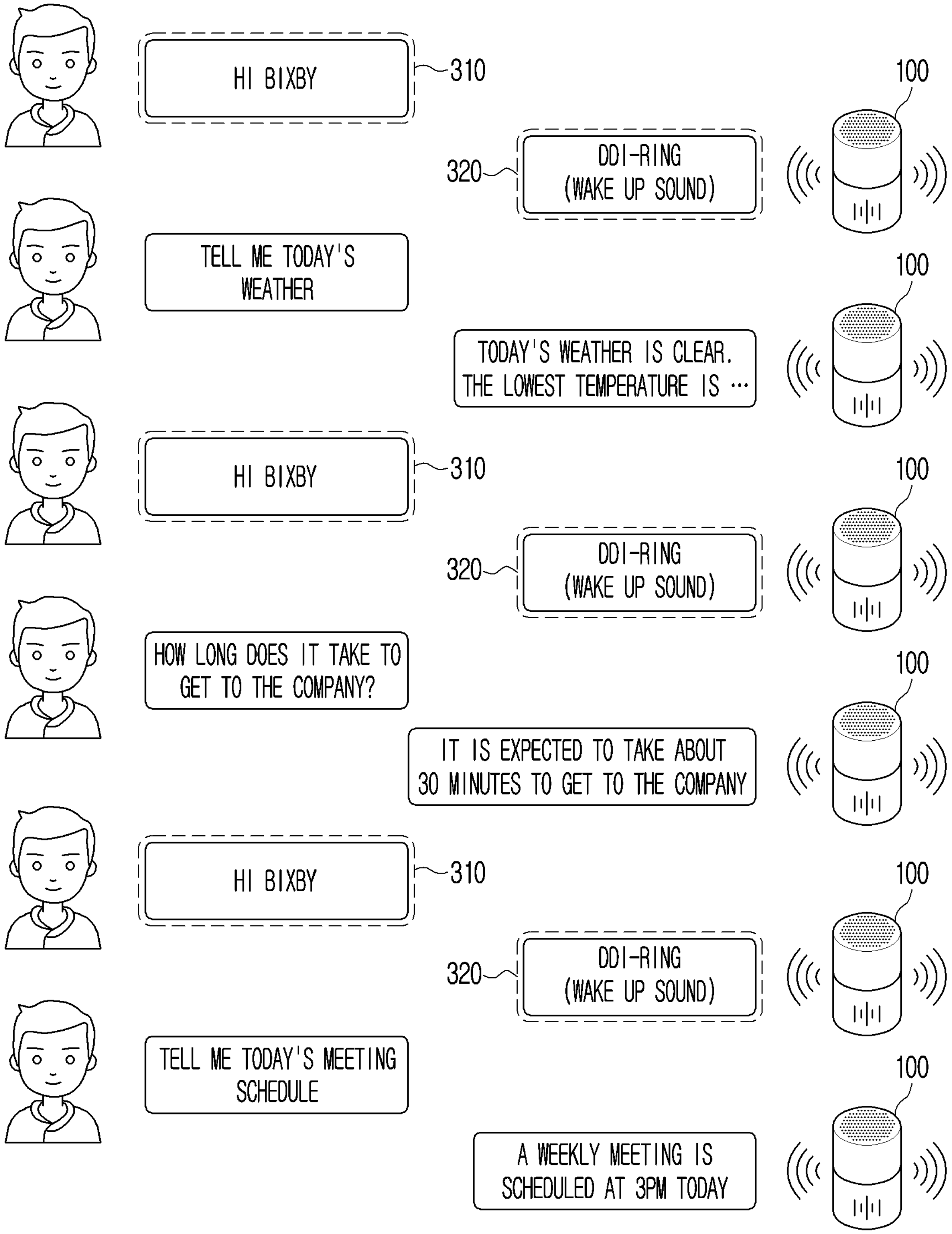
FIG. 3 is a view of an electronic apparatus that recognizes a user voice and performs a wake-up operation, according to related electronic apparatuses.

FIG. 3 is a view of the electronic apparatus 100 that recognizes a user voice and performs a wake-up operation, according to related electronic apparatuses.

Referring to FIG. 3, the electronic apparatus 100 may first need to perform a wake-up operation in order to sense a user voice and identify a user query based on obtained voice data. The wake-up operation may refer to an operation of converting the state of the electronic apparatus 100 from a standby state to a wake-up state.

For example, when the electronic apparatus 100 is in the standby state, the electronic apparatus 100 may not sense an external voice, and/or even if the electronic apparatus 100 senses an external voice, the electronic apparatus 100 may not perform an operation corresponding to the external voice. Alternatively or additionally, when the electronic apparatus 100 is in the standby state, the electronic apparatus 100 may be in a state in which data corresponding to the sensed voice may not be obtained and/or an operation corresponding to the obtained voice data may not be performed (e.g., a TTS module may be inactivated).

When a voice corresponding to the wake-up voice is sensed while the electronic apparatus 100 is in the standby state, the wake-up operation of converting the state of the electronic apparatus 100 from the standby state to the wake-up state may be performed.

When the electronic apparatus 100 is in the wake-up state, the electronic apparatus 100 may sense an external voice and perform an operation corresponding to the sensed external voice.

The electronic apparatus 100 may sense a user voice through the microphone 110 and identify whether the user's wake-up voice 310 (e.g., "Hi, Bixby") is included in the obtained voice data.

When the user's wake-up voice 310 is included in the obtained voice data, the electronic apparatus 100 may perform a wake-up operation, and output a notification sound (e.g., a voice such as "ddi-ring") to notify the user of the wake-up operation.

When the user makes a series of successive queries (e.g., a continuous plurality of different queries), the user may need to repeat the operation of sensing the wake-up voice 310 and outputting a wake-up notification sound 320 whenever making queries. Accordingly, the user may be inconvenienced by having to repeat the wake-up operation in between each successive query, which may negatively impact the user experience. That is, the user and the electronic apparatus 100 may need to repeat the operation in which the processor 140 converts the state of the electronic apparatus 100 from the standby state to the wake-up state. Consequently, operations corresponding to the user queries may not be performed successively and quickly.

Figure 4:
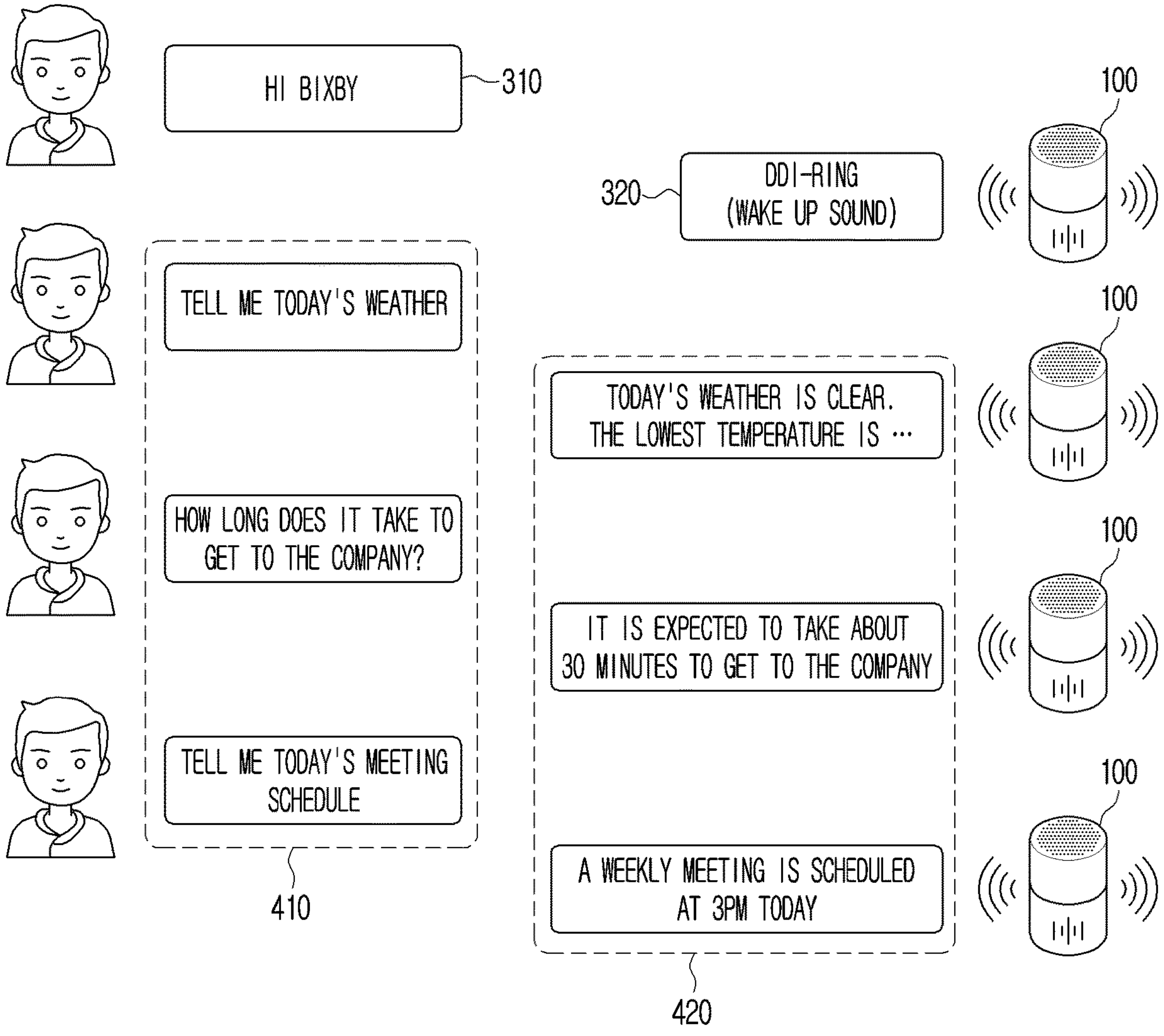
FIG. 4 is a view of an electronic apparatus that performs an operation of recognizing a user voice successively without a repetitive wake-up operation, according to one or more embodiments.

FIG. 4 is a view of the electronic apparatus 100 that performs an operation of recognizing a user voice successively without a repetitive wake-up operation, according to one or more embodiments.

Referring to FIG. 4, the electronic apparatus 100 may initially sense the user's wake-up voice 310 and thus, after outputting the wake-up notification sound 320, the electronic apparatus 100 may sense a user voice without performing a separate wake-up operation as the processor 140 may maintain the state of the electronic apparatus 100 and may identify the user's successive queries 410 based on the obtained voice data. The electronic apparatus 100 may control the speaker 120 to output successive operations 420 corresponding to the user's identified successive queries 410. For example, the successive operations 420 may provide answers to the user's successive queries 410.

In some embodiments, the electronic apparatus 100 may obtain a list of subsequent queries which are likely to be identified as successive queries following the initially-identified preceding queries. When a subsequent query in which a semantic similarity with the subsequent queries included in the query list is higher than or equal to a predetermined value is identified, the electronic apparatus 100 may perform an operation corresponding to the identified subsequent query without performing the wake-up operation separately.

For example, when the identified semantic similarity is higher than or equal to a predetermined value, the processor 140 may maintain the state of the electronic apparatus 100 as the wake-up state without performing an operation corresponding to the second query.

When the semantic similarity is less than the predetermined value, the processor 140 may not perform an operation corresponding to the second query and may convert (e.g., transition) the state of the electronic apparatus 100 from the wake-up state to the standby state.

When the state of the electronic apparatus 100 is converted from the wake-up state to the standby state, the processor 140 may not sense an external voice until a voice corresponding to the wake-up voice is sensed and/or may not obtain voice data corresponding to the sensed external voice. In some embodiments, when the electronic apparatus 100 is in the standby state, the processor 140 may not perform an operation corresponding to the external voice since a TTS module of the electronic apparatus 100 may be inactivated.

When an external voice corresponding to the wake-up voice is sensed after the state of the electronic apparatus 100 is converted from the wake-up state to the standby state, the processor 140 may again convert the state of the electronic apparatus 100 from the standby state to the wake-up state.

The operations of the electronic apparatus 100 described with reference to FIG. 4 may be implemented using a query prediction model, as further described with reference to FIG. 5.

Figure 5:
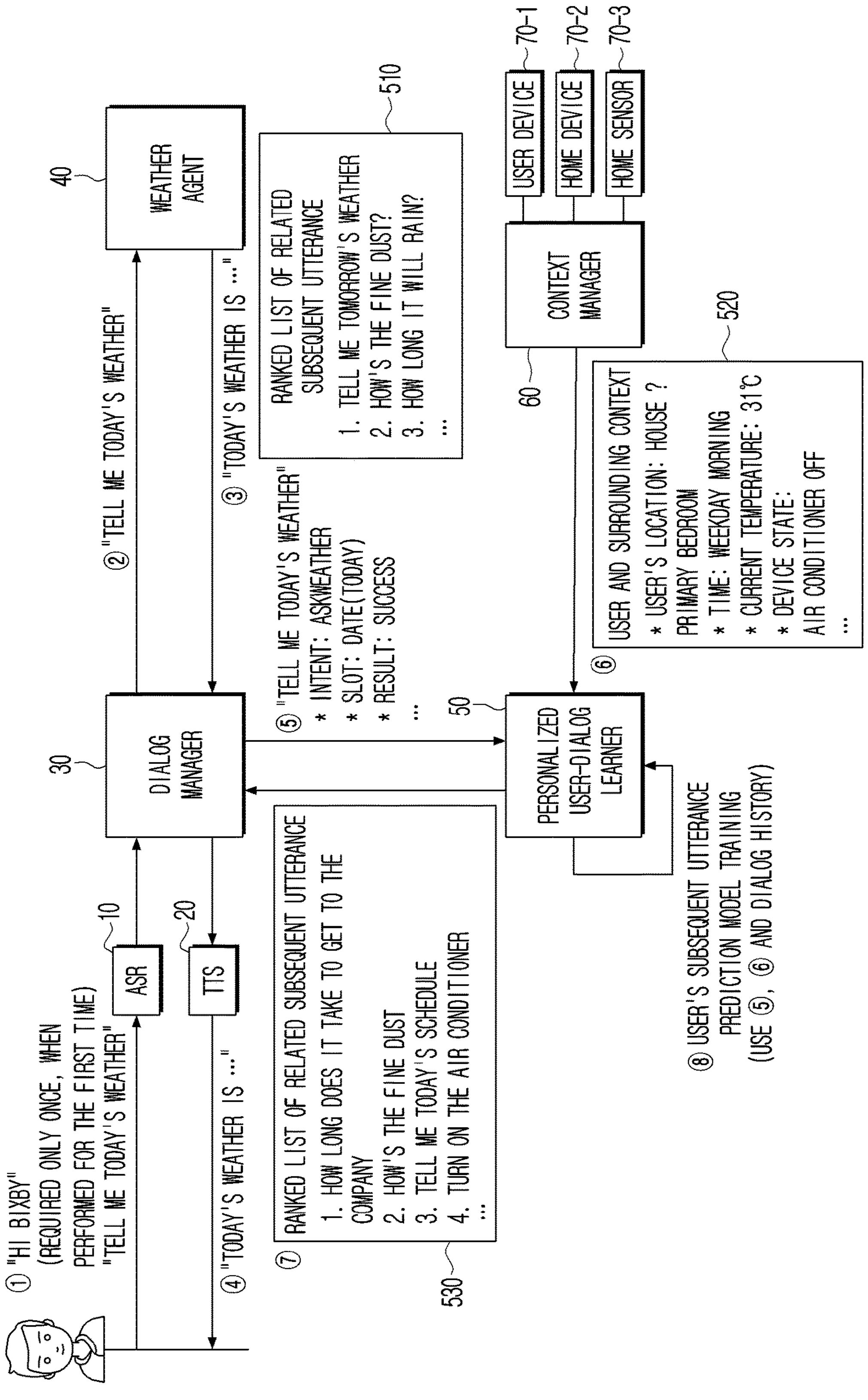
FIG. 5 is a view of an operation performed by each configuration of an electronic apparatus when recognizing a user voice successively without a repetitive wake-up operation using a query prediction model, according to one or more embodiments.

FIG. 5 is a view of an operation performed by each configuration of the electronic apparatus 100 when recognizing a user voice successively without a repetitive wake-up operation using a query prediction model, according to one or more embodiments.

Referring to FIG. 5, the processor 140 may sense the user's first voice through the microphone 110 and identify whether the first voice corresponds to the wake-up voice. When the processor 140 identifies that the first voice corresponds to the wake-up voice, the processor 140 may convert the state of the electronic apparatus 100 from the standby state to the wake-up state.

When a second voice is sensed while the electronic apparatus 100 is in the wake-up state, the processor 140 may obtain first voice data based on the second voice (operation ①).

As shown in FIG. 5, the user's first voice may be the wake-up voice such as "Hi, Bixby", the second voice may be the user's query such as "Tell me today's weather", and the first voice data obtained based on the second voice may be "today" and "weather". However, the present disclosure is not limited in this regard.

The processor 140 may convert the first voice data into text data using an ASR model 10.

The ASR model 10 may be and/or may include a model that may analyze the wave form of the obtained voice data and may identify text data corresponding thereto. In some embodiments, the ASR model 10 may include a preprocessing module that may augment the voice data, an acoustic model (AM) that may analyze the voice data, a language model (LM), and the like.

The processor 140 may identify the meaning of the user's first query, for example, the query of asking about weather, included in the obtained text data through a dialog manager 30 that may include a NLU module, a NLG module, and the like.

In some embodiments, the processor 140 may identify the domain of the first query based on the meaning of the first query. For example, the processor 140 may identify that the domain of a first query "Tell me today's weather" is "weather".

When the processor 140 identifies the domain of the first query (e.g., that the identified first query is a question about the weather), the processor 140 may transmit the first query information to a weather agent 40 (operation ②).

When the first query is "Tell me today's weather", the processor 140 may identify an operation corresponding to the first query and at least one query corresponding to the first query through a weather agent 40 and transmit the same to a dialog manager 30 (operation ③).

For example, when the first query is "Tell me todays' weather", the corresponding operation may be an operation of providing an answer corresponding to the first query (e.g., "Today's weather is clear"). The at least one query corresponding to the first query may refer to a query candidate that may be identified following the first query.

The processor 140 may identify a query list 510 including at least one query corresponding to the first query based on "weather". For example, the query list 510 may include queries like "Tell me tomorrow's weather", "How's the fine dust?", "How long it will rain?", and the like. That is, the first query and a query corresponding to the first query may correspond to the same domain of "weather."

The processor 140 may generate response text data of "Today's weather is clear" corresponding to the first query through the dialog manager 30.

The processor 140 may obtain voice data corresponding to the obtained response text data using the TTS module 20, and may control the speaker 120 to output the obtained voice data (operation ④).

The processor 140 may transmit the user's identified first query and at least one query corresponding to the first query to a personalized user-dialog learner 50) (operation ⑤).

The processor 140 may obtain user context information 520 through a context manager 60.

Figure 6:
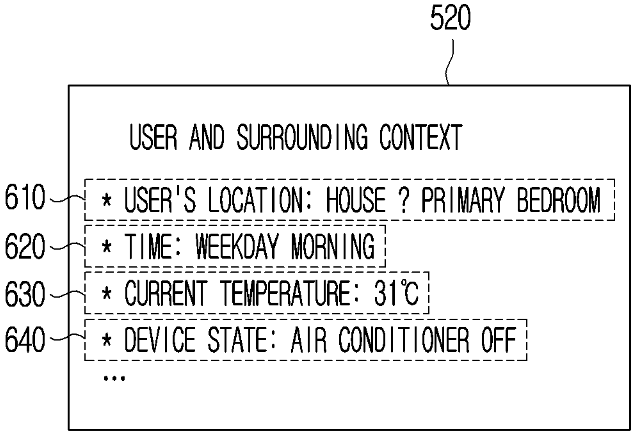
FIG. 6 is a view of user context information, according to one or more embodiments.

FIG. 6 is a view of the user context information 520, according to one or more embodiments.

Referring to FIG. 6, the user context information 520 may include the user's query history and the user's query response history. Alternatively or additionally, the user context information 520 may also include at least one of the user's location 610 (e.g., primary bedroom), the current time 620 (e.g., weekday morning), ambient temperature 630 (e.g., 31° C.), the state 640 of the electronic apparatus 100 (e.g., power on/off), and the user's use history of the electronic apparatus 100. However, the present disclosure is not limited thereto.

Returning to FIG. 5, the context manager 60 may be connected to a user device 70-1, a home device 70-2, a home sensor 70-3, and the like, to receive information regarding the user's location 610, the current time 620, the ambient temperature 630, the current state 640 of the electronic apparatus 100, and the user's use history of the electronic apparatus 100.

The processor 140 may transmit the user context information 520 obtained through the context manager 60 to the personalized user-dialog learner 50 (operation (6).

The processor 140 may obtain a query list 530 including at least one query (e.g., "How long does it take to get to the company?", "How's the fine dust?", "Tell me today's schedule", "Turn on the air conditioner", and the like) based on at least one query corresponding to the first query and the user context information through the personalized user-dialog learner 50.

The at least one query included in the query list 530 may be obtained by combining the query list 510 corresponding to the same domain as the first query and the user context information 520, and may correspond to the same domain as the first query and/or may correspond to a domain different from the first query.

For example, when the user's current location 610 is near the house and the current time 620 is weekday morning, the user may be highly likely to utter the first query of "Tell me today's weather" and then, "How long does it take to get to the company?". In such an example, the query list 530 including the query of "How long does it take to get to the company?" may be obtained.

That is, by considering the user context information 520 together, a query corresponding to a same domain as the domain of the first query, but also a query corresponding to a different domain, may be obtained.

In some embodiments, the processor 140 may identify the query list 530 including at least one query based on a vector value output by inputting the query 510 corresponding to the first query and the user context information 520 to a query prediction model. The query prediction model may be trained based on a vector value output by inputting the user's query and the user context information to a query prediction model (operation ⑧).

The processor 140 may transmit the obtained query list 530 to the dialog manager 30 (operation ⑦).

Subsequently, the processor 140 may identify the user's second query included in second voice data based on the user's third voice sensed through the microphone 110.

When a semantic similarity between the identified second query and at least one query included in the query list 530 is greater than or equal to a predetermined value, the processor 140 may perform an operation corresponding to the second query and may maintain the state of the electronic apparatus 100 as the wake-up state.

When the semantic similarity is less than the predetermined value, the processor 140 may convert the state of the electronic apparatus 100 from the wake-up state to the standby state without performing an operation corresponding to the second query. That is, the processor 140 may prevent the operation corresponding to the second query from being performed.

For example, when the identified second query is about the time it takes to travel to the company and thus, a semantic similarity with the query, "How long does it take to get to the company?", included in the query list 530 is greater than or equal to a predetermined value, an operation corresponding to the second query, that is, an operation of calculating the time to travel to the company and providing an answer, may be performed.

Alternatively or additionally, the processor 140 may identify a query corresponding to the first query and a relevance between the first query and each of at least one query included in the query list based on the user context information.

For example, a relevance to the first query may be identified based on the user's usual query history, the query response history, the current time 620, the user's location 610, ambient temperature 630, and the like.

As used herein, the relevance to the first query may indicate the degree of possibility of being identified next, following the first query. The higher the degree of relevance to the first query, the higher the possibility of being identified next, following the first query.

For example, the more the processor 140 usually has a history of identifying queries on "schedule" after identifying queries on "weather", the processor 140 may identify a query on "schedule' as a query having a high relevance to the user's first query regarding "weather."

The higher the relevance to the first query from among at least one query included in the query list 530, the processor 140 may identify a semantic similarity with the identified second query preferentially. That is, the processor 140 may identify a semantic similarity with the identified second query having a highest (e.g., maximum) relevance to the first query. In some embodiments, the processor 140 may rank (e.g., sort) the query list 530 according to the relevance to the first query. In such embodiments, the processor 140 may select the top ranked query from the query list 530. However, the present disclosure is not limited in this regard, and the query list may be ranked according to other factors and/or values.

When the identified semantic similarity is greater than or equal to a predetermined value, the processor 140 may perform an operation corresponding to the second query.

In some embodiments, the processor 140 may identify meaning included in a sentence using a neural network model that may extract meaning included in text data.

Accordingly, based on user context information such as the user's usual query history, the query response history, the current time 620, the current temperature 630, the user's location 610, and the like, a query having the highest possibility of being identified next, following the first query, is compared with the second query that is identified preferentially, and a corresponding operation may be performed.

Alternatively or additionally, the processor 140 may allocate a predetermined weight corresponding to the domain of the identified first query to each user context information 520.

The processor 140 may obtain the query 510 corresponding to the first query, the user context information 520, and the query list 530 including at least one query based on the weight allocated to each user context information.

For example, when the domain of the identified first query is "weather", a relatively high weight may be allocated to "user's query history" and "user's query response history" among the user context information 520 and a relatively low weight may be allocated to "user's location" so that the user may identify a subsequent query to be made following the query regarding "weather". In such an example, when there is a query history in which the user made a query regarding "schedule" after making a query regarding "weather", the query list 530 including a query of "Tell me today's schedule" may be obtained.

In some embodiments, the processor 140 may exclude from the query list 530 a query corresponding to an operation that may not currently be performed from among the at least one query included in the obtained query list 530.

Figure 7:
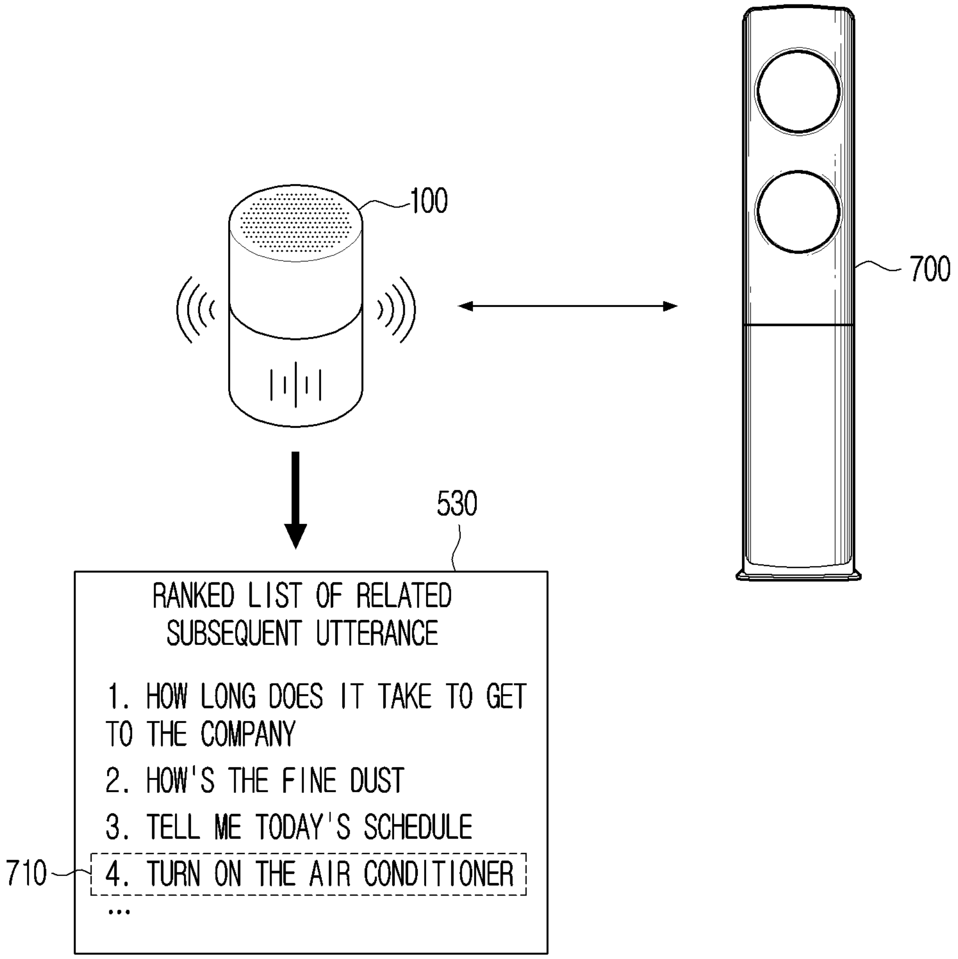
FIG. 7 is a view of an operation of excluding a query corresponding to an operation that may not currently be performed from a query list, according to one or more embodiments.

FIG. 7 is a view of an operation of excluding a query corresponding to an operation that may not currently be performed from a query list, according to one or more embodiments.

Referring to FIG. 7, when the processor 140 performs a communication connection with an air conditioner 700 through a communication interface to identify that the power of the air conditioner is already turned on, the processor 140 may exclude a query of "Turn on the air conditioner" 710 from the obtained query list 530.

By excluding a query that may not currently be performed from the query list 530, the processor 140 may reduce unnecessary operations and/or potentially prevent misrecognition.

The processor 140 may identify the domain of the second query, and when the identified domain of the second query is a domain requiring user confirmation, the processor 140 may control the speaker 120 to output a voice requesting approval as to whether the operation corresponding to the second query may be performed.

When the content for approving the operation corresponding to the second query is included in third voice data obtained based on a fourth voice sensed through the microphone 110, the processor 140 may perform the operation corresponding to the second query and maintain the wake-up state.

When the content for approving the operation corresponding to the second query is not included in the third voice data, the processor 140 may convert the state of the electronic apparatus 100 from the wake-up state to the standby state without performing the operation corresponding to the second query.

Figure 8:
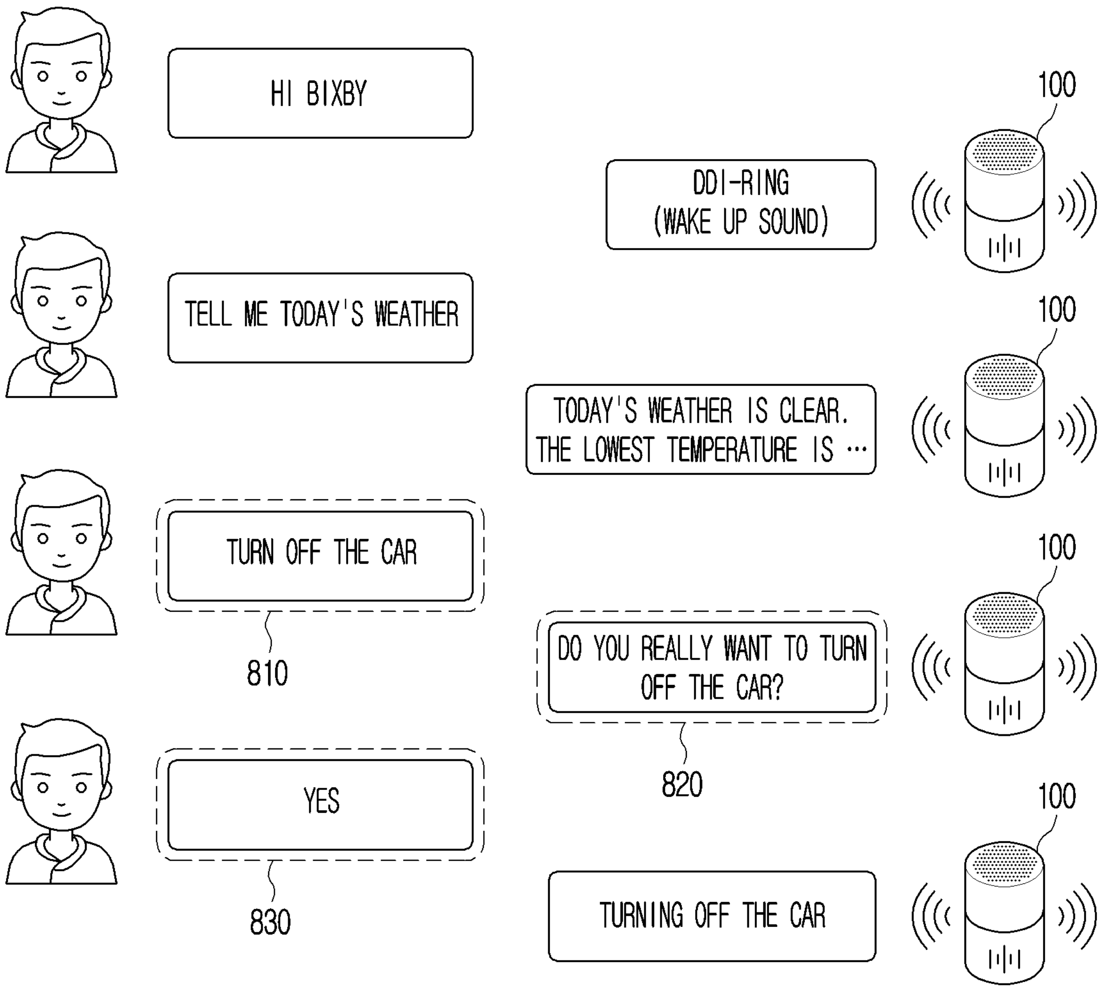
FIG. 8 is a view of a user confirmation operation regarding a query that requires the user confirmation, according to one or more embodiments.

FIG. 8 is a view of a user confirmation operation regarding a query that requires the user confirmation, according to one or more embodiments.

Referring to FIG. 8, when the user's second query is "Turn off the car" 810, the domain of the second query may be "power on/off of the device" or "safety", and the processor 140 may control the speaker 120 to output a confirmation voice 820 of "Do you really want to turn off the car?".

Subsequently, when the user voice sensed through the microphone 110 has the meaning of consent as "Yes" 830, the processor 140 may perform an operation of turning off the car corresponding to "Turn off the car" 810 that is the second query.

In some embodiments, the processor 140 may identify the time taken from when the second voice is sensed to when the third voice is sensed through the microphone 110.

When the time taken (e.g., elapsed time) from when the second voice is sensed to when the third voice is sensed is less than or equal to a predetermined time, the processor 140 may identify the user's second query included in the second voice data obtained based on the third voice.

Figure 9:
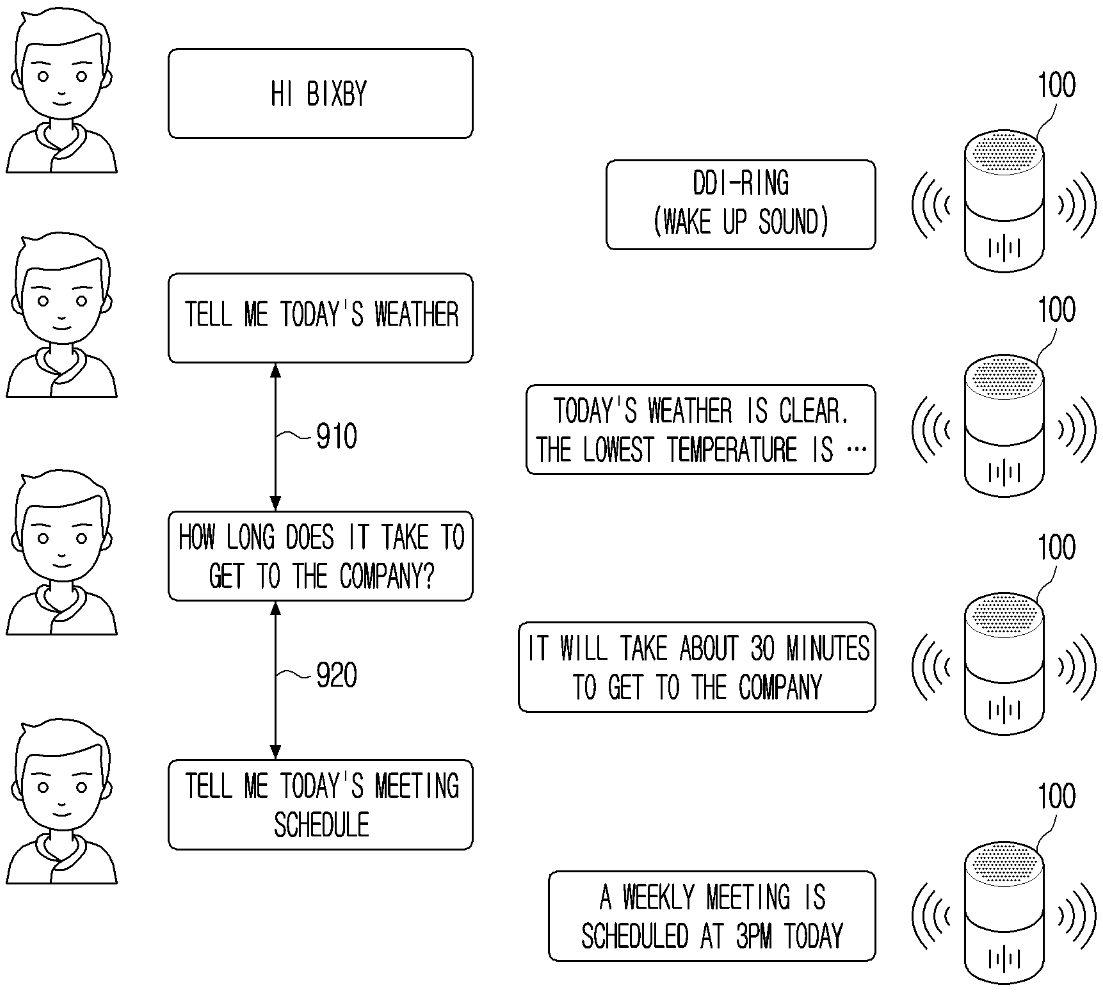
FIG. 9 is a view of an operation of sensing and recognizing a subsequent query sensed within a predetermined time from when a user's query is sensed, according to one or more embodiments.

FIG. 9 is a view of an operation of sensing and recognizing a subsequent query sensed within a predetermined time from when a user's query is sensed, according to one or more embodiments.

Referring to FIG. 9, the first time period 910 taken from when the first query of "Tell me today's weather" is sensed to when the second query of "How long does it take to get to the company?" may be identified. Alternatively or additionally, the processor 140 may identify the second time period 920 taken from when the second query of "How long does it take to get to the company?" to when the third query of "Tell me today's meeting schedule" is sensed.

The processor 140 may perform a corresponding operation to identify a subsequent query only when the first and second time periods 910 and 920 are less than or equal to a predetermined time, which may lower the probability of misrecognition.

Figure 10:
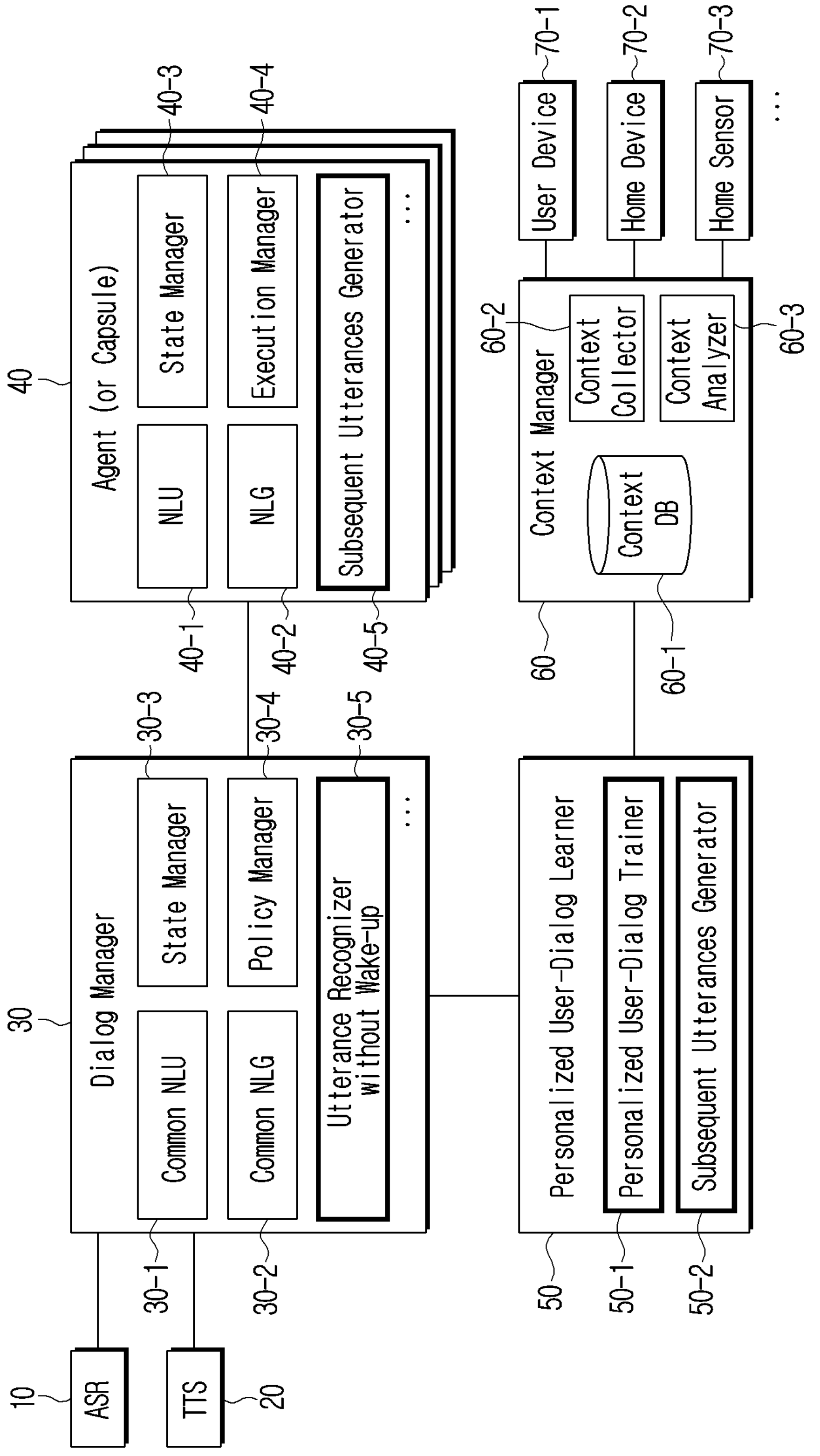
FIG. 10 is a view of a configuration of an electronic apparatus that performs an operation of recognizing a user voice successively without a repetitive wake-up operation by recognizing the user voice, according to one or more embodiments.

FIG. 10 is a view of a configuration of the electronic apparatus 100 that may perform an operation of recognizing a user voice successively without a repetitive wake-up operation by recognizing the user voice, according to one or more embodiments.

Referring to FIG. 10, the dialog manager 30 may include a common NLU module 30-1, a common NLG module 30-2, a state manager 30-3, a policy manager 30-4, and an utterance recognizer without wake-up module 30-5.

The processor 140 may identify the meaning of text data converted from voice data through the NLU module 30-1 and the utterance recognizer without wake-up module 30-5. The processor 140 may generate text data for an answer to be provided to the user through the NLG module 30-2 and the state manager 30-3.

The agent 40 may include a NLU module 40-1, a NLG module 40-2, a state manager 40-3, an execution manager 40-4, and a subsequent utterances generator module 40-5.

The processor 140 may identify a query corresponding to the first query through the subsequent utterances generator module 40-5. That is, the processor 140 may identify a query corresponding to the first query based on the domain of the first query.

The personalized user-dialog learner 50 may include a personalized user-dialog trainer 50-1 and a subsequent utterances generator 50-2.

The processor 140 may train a query prediction model through the personalized user-dialog trainer 50-1, and obtain a query list including at least one query obtained based on a query corresponding to the first query and the user context information through the subsequent utterances generator 50-2.

The context manager 60 may include a context database 60-1, a context collector module 60-2, and a context analyzer module 60-3.

The processor 140 may obtain the user context information from an external device (e.g., a user device 70-1, a home device 70-2, or a home sensor 70-3), through the context collector module 60-2. The processor 140 may identify various information included in the user context information through the context analyzer module 60-3.

Figure 11:
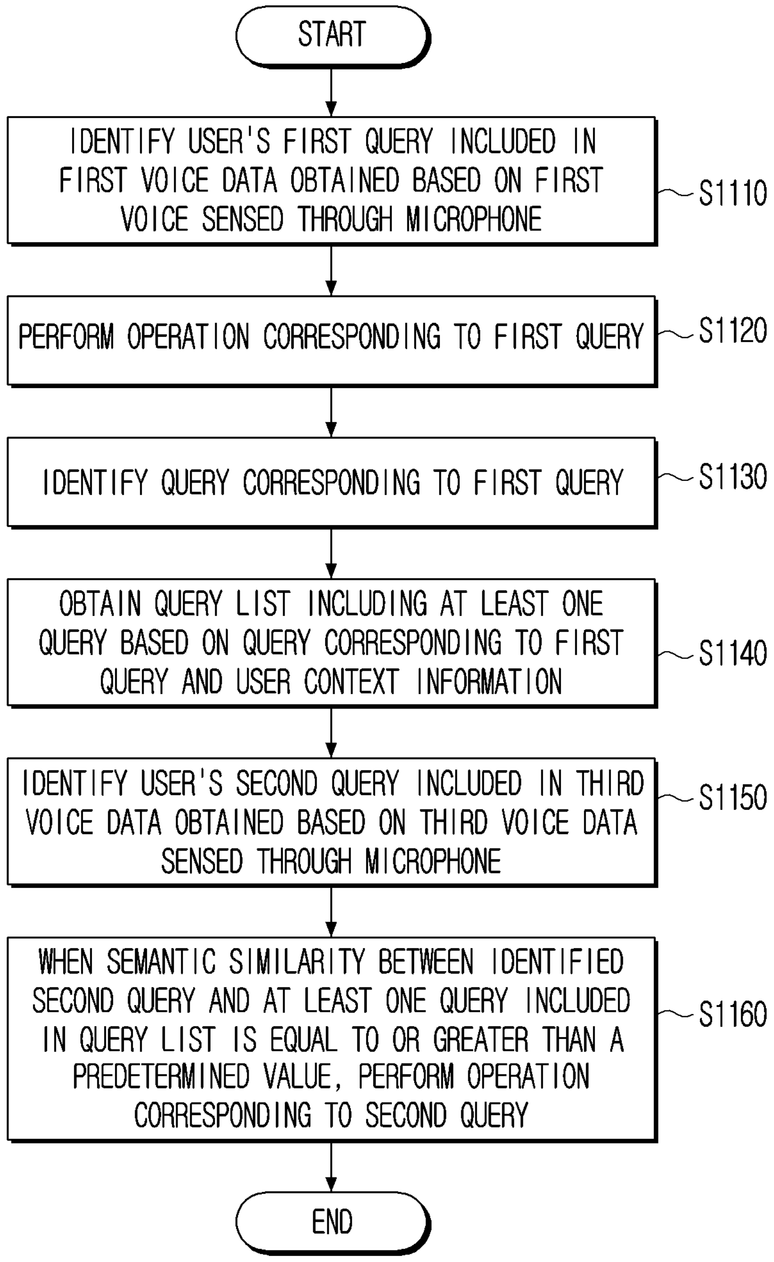
FIG. 11 is a flowchart of an operation of an electronic apparatus, according to one or more embodiments.

FIG. 11 is a flowchart of an operation of the electronic apparatus 100, according to one or more embodiments.

Referring to FIG. 11, when the electronic apparatus 100 identifies that the first voice sensed through the microphone 110 corresponds to the wake-up voice, the electronic apparatus 100 may convert the state of the electronic apparatus 100 from the standby state to the wake-up state.

When the second voice is sensed while the electronic apparatus 100 is in the wake-up state, the user's first query included in the first voice data obtained based on the sensed second voice may be identified. The user's first query may be and/or may include a query that inquires about information that the user wants to know (operation S1110).

The electronic apparatus 100 may perform an operation corresponding to the first query (operation S1120). The operation corresponding to the first query may be and/or may include an operation of providing a service to the user by controlling some configuration of the electronic apparatus 100. Alternatively or additionally, the operation corresponding to the first query may be and/or may include an operation of controlling the speaker 120 to output an answer to the user query by the electronic apparatus 100.

The electronic apparatus 100 may identify a query corresponding to the first query (operation S1130). The query corresponding to the first query may be a query that may be different from the first query, and/or may be an arbitrary query candidate that may be identified as a subsequent query following the first query. In addition, the query corresponding to the first query may be related to the domain (e.g., weather, route finding, schedule, and the like) corresponding to the first query. That is, although the first query and the query corresponding to the first query may correspond to the same domain, the first query and the query corresponding to the first query may be different queries.

The electronic apparatus 100 may obtain a query list including at least one query based on a query corresponding to the first query and the user context information (operation S1140). The user context information may include at least one of the current state of the electronic apparatus 100, the user's use history of the electronic apparatus 100, the user's query history, time, location, temperature, and the like. However, the present disclosure is not limited thereto.

The electronic apparatus 100 may identify the user's second query included in the second voice data obtained based on the second voice sensed through the microphone 110 (operation S1150).

When a semantic similarity between the identified second query and at least one query included in the query list is greater than or equal to a predetermined value, the electronic apparatus 100 may perform an operation corresponding to the second query and may maintain the state of the electronic apparatus 100 as the wake-up state.

When the semantic similarity is less than the predetermined value, the electronic apparatus 100 may not perform the operation corresponding to the second query and may convert the state of the electronic apparatus 100 from the wake-up state to the standby state (operation S1160).

A function related to the artificial intelligence, according to one or more embodiments, may be operated through the processor 140 and the memory 130 of the electronic apparatus 100.

The processor 140 may consist of one or more processors 140. For example, the one or more processors 140 may include at least one of a CPU, a GPU, or a NPU. However, the present disclosure is not limited to the foregoing examples of processors 140.

The CPU, which may be a general-purpose processor 140 capable of performing not only general calculations but also artificial intelligence calculations, may be capable of efficiently executing complex programs through a multi-layer cache structure. The CPU may be advantageous for a serial processing method that may enable organic linkage between a previous calculation result and a next calculation result through sequential calculations. The general-purpose processor 140 is not limited to the above-described example unless specified as a CPU as described above.

The GPU, which may be a processor 140 for mass operations such as floating-point operations used for graphics processing, may be capable of performing large-scale operations in parallel by integrating a large number of cores. The GPU may be advantageous for a parallel processing method such as a convolution operation, as compared to the CPU. Alternatively or additionally, the GPU may be used as a co-processor 140 to may supplement the functions of the CPU. The graphics processor 140 for mass operations is not limited to the above-described example unless specified as a GPU as described above.

The NPU may be a processor 140 specialized in artificial intelligence calculations using an artificial neural network. For example, each layer constituting the artificial neural network may be implemented as hardware (e.g., silicon). In this case, the NPU may be specially designed as requested by an entity, and thus may have a lower degree of freedom than the CPU or GPU. However, the NPU may be capable of efficiently processing artificial intelligence calculations required by the entity. As the processor 140 may be specialized for artificial intelligence calculations, the NPU may be implemented in various forms such as a tensor processing unit (TPU), an intelligence processing unit (IPU), and a vision processing unit (VPU). The artificial intelligence processor 140 is not limited to the above-described example unless specified as an NPU as described above.

The one or more processors 140 may be implemented as a system on chip (SoC). In such an example, the SoC may further include the memory 130 and a network interface such as a bus for data communication between the processors 140 and the memory 130 in addition to the one or more processors 140.

In a case where the system on chip (SoC) included in the electronic apparatus 100 includes a plurality of processors 140, the electronic apparatus 100 may perform artificial intelligence-related calculations (e.g., operations related to the learning or inference of the artificial intelligence model) using at least a portion of the plurality of processors 140. For example, the electronic apparatus 100 may perform artificial intelligence-related calculations using at least one of a GPU, an NPU, a VPU, a TPU, or a hardware accelerator, which may specialized in artificial intelligence calculations such as, but not limited to, a convolution operation and a matrix multiplication operation, among the plurality of processors 140. However, the present disclosure is not limited in this regard, and artificial intelligence-related calculations may be performed using a general-purpose processor 140 such as a CPU.

In some embodiments, the electronic apparatus 100 may perform calculations for artificial intelligence-related functions using multiple cores (e.g., dual cores or quadruple cores) included in the processor 140. For example, the electronic apparatus 100 may perform artificial intelligence operations, such as a convolution operation and a matrix multiplication operation, in parallel using multiple cores included in the processor 140.

The one or more processors 140 may perform control to process input data according to a predefined operating rule and/or an artificial intelligence model stored in the memory 130. The predefined operating rule or artificial intelligence model may be created through learning.

The creation of the predefined operating rule and/or artificial intelligence model through learning may refer to the predefined operating rules and/or the artificial intelligence model with desired characteristics being created by applying learning algorithms to a large number of pieces of learning data. Such learning may be performed in the apparatus itself in which artificial intelligence is performed according to the present disclosure, and/or may be performed through a separate server/system.

In some embodiments, the artificial intelligence model may be constituted by a plurality of neural network layers. At least one layer may have at least one weight value, and a layer operation may performed through a result of a previous layer operation and at least one defined operation.

Examples of neural networks may include, but not be limited to, a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-network, and a transformer. However, the neural network in the present disclosure may not be limited to the above-described examples unless specified.

The learning algorithm may refer to a technique by which a predetermined target device (e.g., a robot) may be trained using a large number of pieces of learning data so that the predetermined target device is enabled to make a decision and/or make a prediction by itself. Examples of learning algorithms may include, but may not be limited to, supervised learning, unsupervised learning, semi-supervised learning, and reinforcement learning. However, the learning algorithm in the present disclosure may not be limited to the above-described examples unless specified.

According to one or more embodiments, the methods according to the various embodiments described above may be included and/or provided in a computer program product. The computer program product may be traded as a product between a seller and a purchaser. The computer program product may be distributed in the form of a storage medium (e.g., compact disc read only memory (CD-ROM)) that may be readable by devices, may be distributed through an application store (e.g., Play Store™) or directly between two user devices (e.g., smartphones), and/or may be distributed online (e.g., by downloading or uploading). In the case of an online distribution, at least part of the computer program product (e.g., a downloadable application) may be at least temporarily stored in a storage medium readable by a machine such as a server of the manufacturer, a server of an application store, or a memory of a relay server or may be temporarily generated.

In the above, preferred embodiments have been illustrated and described, but the present disclosure is not limited to the specific embodiments described above, and those of ordinary skill in the art pertaining to the present disclosure may modify the embodiments without departing from the gist of the claims and these modifications should not be individually understood from the technical spirit or perspective of the present disclosure.

What is claimed is:

1. An electronic apparatus comprising:

a microphone;

a speaker;

a memory storing at least one instruction; and one or more processors;

wherein the one or more processors are configured to execute the at least one instruction to:

based on identifying that a first voice sensed through the microphone corresponds to a wake-up voice, convert a state of the electronic apparatus from a standby state to a wake-up state, based on a second voice being sensed while the state of the electronic apparatus is the wake-up state, identify a first user query included in first voice data obtained based on the second voice, perform a first operation corresponding to the first user query, identify a predetermined query corresponding to the first user query, obtain a query list comprising at least one query based on the predetermined query and user context information, identify a relevance to the first user query for each of the at least one query of the query list based on the predetermined query and the user context information, identify, from among the query list, a corresponding query having a maximum relevance to the first user query, identify a second user query included in second voice data obtained based on a third voice sensed through the microphone, identify a first semantic similarity between the second user query and the corresponding query having the maximum relevance, based on the first semantic similarity being greater than or equal to a predetermined value, perform a second operation corresponding to the second user query and maintain the state of the electronic apparatus as the wake-up state, identify a second semantic similarity between the second user query and the corresponding query, based on the second semantic similarity being greater than or equal to the predetermined value, perform the second operation corresponding to the second user query and maintain the state of the electronic apparatus as the wake-up state, and based on the second semantic similarity being less than the predetermined value, convert the state of the electronic apparatus from the wake-up state to the standby state and prevent performing the second operation corresponding to the second user query.

2. The electronic apparatus of claim 1, wherein the one or more processors are further configured to execute the at least one instruction to:

based on the first semantic similarity being less than the predetermined value, change the state of the electronic apparatus from the wake-up state to the standby state without performing the second operation corresponding to the second user query.

3. The electronic apparatus of claim 1, wherein the one or more processors are further configured to execute the at least one instruction to:

identify a domain of the first user query, and identify the predetermined query based on the domain.

4. The electronic apparatus of claim 1, wherein the user context information comprises at least one of a query history of a user, a query response history of the user, a location of the user, a current time, an ambient temperature, a current state of the electronic apparatus, or a use history of the electronic apparatus by the user.

5. The electronic apparatus of claim 1, wherein the user context information comprises at least one of a query history of a user, a query response history of the user, a location of the user, a current time, an ambient temperature, a current state of the electronic apparatus, or a use history of the electronic apparatus by the user, and wherein the one or more processors are further configured to execute the at least one instruction to:

identify a domain of the first user query, identify the predetermined query based on the domain, allocate a predetermined weight corresponding to the domain to the user context information, and obtain the query list comprising the at least one query based on the predetermined query, the user context information, and the predetermined weight allocated to the user context information.

6. The electronic apparatus of claim 1, wherein the one or more processors are further configured to execute the at least one instruction to:

exclude, from the query list, an unperformable query corresponding to an operation that is not currently performable by the electronic apparatus.

7. The electronic apparatus of claim 1, wherein the one or more processors are further configured to execute the at least one instruction to:

identify a domain of the second user query, based on the domain requiring user confirmation, control the speaker to output a voice requesting confirmation on whether the second operation corresponding to the second user query is to be performed, based on content approving to perform the second operation, perform the second operation corresponding to the second user query and maintain the state of the electronic apparatus as the wake-up state, the content being included in third voice data obtained based on a fourth voice sensed through the microphone, and based on the content not approving to perform the second operation, change the state of the electronic apparatus from the wake-up state to the standby state and prevent performing the second operation corresponding to the second user query.

8. The electronic apparatus of claim 1, wherein the one or more processors are further configured to execute the at least one instruction to:

identify an elapsed time from a first time point when the second voice is sensed through the microphone to a second time point when the third voice is sensed through the microphone, and based on the elapsed time being less than or equal to a predetermined time, identify the second user query from the second voice data obtained based on the third voice.

9. The electronic apparatus of claim 1, wherein the one or more processors are further configured to execute the at least one instruction to:

obtain the query list comprising the at least one query based on a first vector value output by a query prediction model based on the predetermined query and the user context information, and wherein the query prediction model is trained based on a second vector value generated by the query prediction model based on providing a third user query and the user context information to the query prediction model.

10. A controlling method of an electronic apparatus, the controlling method comprising:

based on identifying that a first voice sensed corresponds to a wake-up voice, converting a state of the electronic apparatus from a standby state to a wake-up state;

based on a second voice being sensed while the state of the electronic apparatus is the wake-up state, identifying a first user query included in first voice data obtained based on the second voice sensed through a microphone of the electronic apparatus;

performing a first operation corresponding to the first user query;

identifying a predetermined query corresponding to the first user query;

obtaining a query list comprising at least one query based on the predetermined query and user context information;

identifying a relevance to the first user query for each of the at least one query of the query list based on the predetermined query and the user context information;

identifying, from among the query list, a corresponding query having a maximum relevance to the first user query;

identifying a second user query included in second voice data obtained based on a third voice sensed through the microphone;

identifying a first semantic similarity between the second user query and the corresponding query having the maximum relevance;

based on the first semantic similarity being greater than or equal to a predetermined value, performing a second operation corresponding to the second user query and maintaining the state of the electronic apparatus as the wake-up state;

identifying a second semantic similarity between the second user query and the corresponding query;

based on the second semantic similarity being greater than or equal to the predetermined value, performing the second operation corresponding to the second user query and maintaining the state of the electronic apparatus as the wake-up state; and based on the second semantic similarity being less than the predetermined value, changing the state of the electronic apparatus from the wake-up state to the standby state and preventing the performing of the second operation corresponding to the second user query.

11. The controlling method of claim 10, further comprising:

based on the first semantic similarity being less than the predetermined value, changing the state of the electronic apparatus from the wake-up state to the standby state without performing of the second operation corresponding to the second user query.

12. The controlling method of claim 10, wherein the identifying the predetermined query comprises:

determining a domain of the first user query; and identifying the predetermined query based on the domain.

13. The controlling method of claim 10, wherein the user context information comprises at least one of a query history of a user, a query response history of the user, a location of the user, a current time, an ambient temperature, a current state of the electronic apparatus, or a use history of the electronic apparatus by the user.

14. The controlling method of claim 10, wherein the user context information comprises at least one of a query history of a user, a query response history of the user, a location of the user, a current time, an ambient temperature, a current state of the electronic apparatus, or a use history of the electronic apparatus by the user, and wherein the controlling method further comprises:

determining a domain of the first user query;

identifying the predetermined query based on the domain; and allocating a predetermined weight corresponding to the domain to the user context information, and wherein the obtaining the query list comprises obtaining the query list comprising the at least one query based on the predetermined query, the user context information, and the predetermined weight allocated to the user context information.

15. The controlling method of claim 10, further comprising:

determining a domain of the second user query;

based on the domain requiring user confirmation, outputting a voice requesting confirmation on whether the second operation corresponding to the second user query is to be performed;

based on content approving to perform the second operation, performing the second operation corresponding to the second user query and maintaining the state of the electronic apparatus as the wake-up state, the content being included in third voice data obtained based on a fourth voice sensed through the microphone; and based on the content not approving to perform the second operation, changing the state of the electronic apparatus from the wake-up state to the standby state and preventing the performing of the second operation corresponding to the second user query.

16. The controlling method of claim 10, further comprising:

identifying an elapsed time from a first time point when the second voice is sensed through the microphone to a second time point when the third voice is sensed through the microphone; and based on the elapsed time being less than or equal to a predetermined time, extracting the second user query from the second voice data obtained based on the third voice.

17. The controlling method of claim 10, wherein the obtaining the query list comprises obtaining the query list comprising the at least one query based on a first vector value output by a query prediction model based on the predetermined query and the user context information, and wherein the query prediction model is trained based on a second vector value generated by the query prediction model based on providing a third user query and the user context information to the query prediction model.

18. A non-transitory computer readable recording medium including a program executes a controlling method of an electronic apparatus, the controlling method comprising:

based on identifying that a first voice sensed corresponds to a wake-up voice, converting a state of the electronic apparatus from a standby state to a wake-up state;

based on a second voice being sensed while the state of the electronic apparatus is the wake-up state, identifying a first user query included in first voice data obtained based on the second voice sensed through a microphone of the electronic apparatus;

performing a first operation corresponding to the first user query;

identifying a predetermined query corresponding to the first user query;

obtaining a query list comprising at least one query based on the predetermined query and user context information;

identifying a relevance to the first user query for each of the at least one query of the query list based on the predetermined query and the user context information;

identifying, from among the query list, a corresponding query having a maximum relevance to the first user query;

identifying a second user query included in second voice data obtained based on a third voice sensed through the microphone;

identifying a semantic similarity between the second user query and the corresponding query having the maximum relevance;

based on the semantic similarity between the second user query and the at least one query of the query list being greater than or equal to a predetermined value, performing a second operation corresponding to the second user query and maintaining the state of the electronic apparatus as the wake-up state;

identifying a second semantic similarity between the second user query and the corresponding query;

based on the second semantic similarity being greater than or equal to the predetermined value, performing the second operation corresponding to the second user query and maintain the state of the electronic apparatus as the wake-up state; and based on the second semantic similarity being less than the predetermined value, converting the state of the electronic apparatus from the wake-up state to the standby state and prevent performing the second operation corresponding to the second user query.

* * * * *